(12) United States Patent
Hanrahan et al.

(10) Patent No.: US 12,529,349 B2
(45) Date of Patent: Jan. 20, 2026

(54) AIRCRAFT PROPULSION SYSTEM WITH VARIABLE SPEED ROTATING STRUCTURE

(71) Applicant: Raytheon Technologies Corporation, Farmington, CT (US)

(72) Inventors: Paul R. Hanrahan, Sedona, AZ (US); Michael G. McCaffrey, Windsor, CT (US)

(73) Assignee: RTX Corporation, Farmington, CT (US)

( * ) Notice: Subject to any disclaimer, the term of this patent is extended or adjusted under 35 U.S.C. 154(b) by 23 days.

(21) Appl. No.: 18/202,731

(22) Filed: May 26, 2023

(65) Prior Publication Data

US 2023/0383695 A1    Nov. 30, 2023

Related U.S. Application Data

(60) Provisional application No. 63/346,171, filed on May 26, 2022.

(51) Int. Cl.
*F02K 3/06* (2006.01)
*B64C 27/12* (2006.01)
(Continued)

(52) U.S. Cl.
CPC ............... *F02K 3/06* (2013.01); *B64C 27/12* (2013.01); *B64D 27/10* (2013.01); *B64D 35/00* (2013.01);
(Continued)

(58) Field of Classification Search
CPC ..... B64C 27/23; B64C 29/00; B64C 29/0016; B64C 29/0025; B64D 27/10; B64D 35/00;
(Continued)

(56) References Cited

U.S. PATENT DOCUMENTS 3,351,304 A * 11/1967 Stein ........................ B64C 27/82
                                                          416/171
3,483,696 A * 12/1969 Gilbert ..................... B64C 27/08
                                                          416/157 R
(Continued)

FOREIGN PATENT DOCUMENTS

DE          1119675 B       12/1961
GB          1439988 A        6/1976

OTHER PUBLICATIONS

"Overview of Variable-Speed Power-Turbine Research", https://core.ac.uk/download/pdf/10560017.pdf, Aug. 30, 2019.
(Continued)

*Primary Examiner* — Steven M Sutherland
(74) *Attorney, Agent, or Firm* — Getz Balich LLC

(57) ABSTRACT

A propulsion system includes a first propulsor rotor, a second propulsor rotor and a gas turbine engine core. The first propulsor rotor is configured to generate propulsive thrust. The second propulsor rotor is configured to generate propulsive lift. The gas turbine engine core includes a compressor section, a combustor section, a turbine section and a rotating structure. The rotating structure includes a turbine rotor within the turbine section. The gas turbine engine core is configured to rotate the rotating structure at a first rotational speed during a first mode to drive the first propulsor rotor to generate the propulsive thrust. The gas turbine engine core is configured to rotate the rotating structure at a second rotational speed during a second mode to drive the second propulsor rotor to generate the propulsive lift. The second rotational speed may be less than eighty percent of the first rotational speed.

19 Claims, 5 Drawing Sheets

(51) Int. Cl.
  *B64D 27/10* (2006.01)
  *B64D 35/00* (2006.01)
  *F02C 7/36* (2006.01)
  *F02C 9/16* (2006.01)

(52) U.S. Cl.
  CPC ............... *F02C 7/36* (2013.01); *F02C 9/16* (2013.01); *F05D 2220/328* (2013.01); *F05D 2250/314* (2013.01); *F05D 2270/02* (2013.01)

(58) Field of Classification Search
  CPC ...... F02C 7/36; F02C 9/16; F02K 3/06; F05D 2220/328; F05D 2250/314; F05D 2270/02
  See application file for complete search history.

(56) References Cited

U.S. PATENT DOCUMENTS

| | | | |
|---|---|---|---|
| 3,678,690 A | 7/1972 | Shohet | |
| 3,870,251 A * | 3/1975 | Breuner | B64C 27/02 416/123 |
| 4,118,997 A * | 10/1978 | Woodward | F01D 15/12 74/417 |
| 4,651,521 A | 3/1987 | Ossi | |
| 4,936,748 A * | 6/1990 | Adamson | F02C 6/206 416/129 |
| 5,209,428 A | 5/1993 | Bevilaqua | |
| 6,269,627 B1 * | 8/2001 | Freese | F02K 1/17 60/233 |
| 9,506,422 B2 * | 11/2016 | Gallagher | F02K 1/06 |
| 10,876,411 B2 | 12/2020 | Ramirez | |
| 10,968,748 B2 | 4/2021 | Ramirez | |
| 11,073,160 B2 | 7/2021 | Murugan | |
| 2016/0229531 A1 | 8/2016 | Robertson | |

OTHER PUBLICATIONS

"Overview of Variable-Speed Power-Turbine Research", https://www.science.gov/topicpages/v/variable-speed+power+turbine, Jan. 1, 2011.

"RVLT TC1.1:Variable Speed Power Turbine Tech Demo", https://techport.nasa.gov/view/93071, Jul. 21, 2021.

Ashlie Flegel, "Aerodynamic Measurements of a Variable-Speed Power-Turbine Blade Section in a Transonic Turbine Cascade" https://engagedscholarship.csuohio.edu/cgi/viewcontent.cgi?article=1852&context=etdarchive, May 2007.

Flegel-McVetta et al. "Aerodynamic Measurements of a Variable-Speed Power-Turbine Blade Section in a Transonic Turbine Cascade at Low Inlet Turbulence", NASA/TM-2013-218069, Aug. 2013.

EP Search Report for EP Patent Application No. 23175693.3 dated Oct. 12, 2023.

EP Office Action for EP Patent Application No. 23175693.3 dated Sep. 19, 2025.

* cited by examiner

AIRCRAFT PROPULSION SYSTEM WITH VARIABLE SPEED ROTATING STRUCTURE

This application claims priority to U.S. Patent Appln. No. 63/346,171 filed May 26, 2022 which is hereby incorporated herein by reference in its entirety.

BACKGROUND OF THE DISCLOSURE

1. Technical Field

This disclosure relates generally to an aircraft and, more particularly, to an aircraft propulsion system for alternately generating power for multi-directional propulsion.

2. Background Information

Various types and configurations of propulsion systems are known in the art for an aircraft. While these known aircraft propulsion systems have various benefits, there is still room in the art for improvement.

SUMMARY OF THE DISCLOSURE

According to an aspect of the present disclosure, a propulsion system is provided for an aircraft. This aircraft propulsion system includes a first propulsor rotor, a second propulsor rotor and a gas turbine engine core. The first propulsor rotor is configured to generate propulsive thrust. The second propulsor rotor is configured to generate propulsive lift. The gas turbine engine core includes a compressor section, a combustor section, a turbine section and a rotating structure. The rotating structure includes a turbine rotor within the turbine section. The gas turbine engine core is configured to rotate the rotating structure at a first rotational speed during a first mode to drive the first propulsor rotor to generate the propulsive thrust. The gas turbine engine core is configured to rotate the rotating structure at a second rotational speed during a second mode to drive the second propulsor rotor to generate the propulsive lift. The second rotational speed may be less than eighty percent of the first rotational speed.

According to another aspect of the present disclosure, another propulsion system is provided for an aircraft. This aircraft propulsion system includes a first propulsor rotor, a second propulsor rotor and a gas turbine engine core. The first propulsor rotor is configured to generate propulsive thrust. The second propulsor rotor is configured to generate propulsive lift. The gas turbine engine core includes a compressor section, a combustor section, a turbine section and a rotating structure. The rotating structure includes a turbine rotor within the turbine section. The gas turbine engine core is configured to rotate the rotating structure during a first mode to drive the first propulsor rotor to generate the propulsive thrust. The propulsion system has a first engine pressure ratio during the first mode. The gas turbine engine core is configured to rotate the rotating structure during a second mode to drive the second propulsor rotor to generate the propulsive lift. The propulsion system has a second engine pressure ratio during the second mode. The second engine pressure ratio is less than the first engine pressure ratio.

According to still another aspect of the present disclosure, an aircraft system is provided that includes a first output, a second output and a gas turbine engine core. The gas turbine engine core includes a compressor section, a combustor section, a turbine section and a rotating structure. The rotating structure includes a turbine rotor within the turbine section. The gas turbine engine core is configured to rotate the rotating structure at a first rotational speed during a first mode to rotatably drive the first output. The propulsion system has a first engine pressure ratio between 1.25 and 3.0 during the first mode. The gas turbine engine core is configured to rotate the rotating structure at a second rotational speed during a second mode to rotatably drive the second output. The second rotational speed is between fifty-five percent and seventy-five percent of the first rotational speed. The propulsion system has a second engine pressure ratio between 1.01 and 1.06 during the second mode.

The first engine pressure ratio may be between 1.25 and 3.0.

The second engine pressure ratio may be between 1.01 and 1.06.

The gas turbine engine core may be configured to rotate the rotating structure at a first rotational speed during the first mode to drive the first propulsor rotor to generate the propulsive thrust. The gas turbine engine core may also be configured to rotate the rotating structure at a second rotational speed during the second mode to drive the second propulsor rotor to generate the propulsive lift. The second rotational speed may be less than eighty percent of the first rotational speed.

The second rotational speed may be between fifty-five percent and seventy-five percent of the first rotational speed.

The propulsion system may have a first engine pressure ratio during the first mode. The propulsion system may have a second engine pressure ratio during the second mode that is less than the first engine pressure ratio.

The first engine pressure ratio may be greater than 1.2.

The second engine pressure ratio may be less than 1.1.

The first engine pressure ratio may be between 1.25 and 3.0. In addition or alternatively, the second engine pressure ratio may be between 1.01 and 1.06.

The gas turbine engine core may also be configured to rotate the first propulsor rotor during the second mode. The first propulsor rotor may be configured to generate at least one and one-half times more thrust during that first mode than during the second mode.

The propulsion system may also include a transmission configured to: decouple the second propulsor rotor from the rotating structure during the first mode; and couple the second propulsor rotor to the rotating structure during the second mode.

The propulsion system may also include a geartrain coupling the rotating structure to the first propulsor rotor and the second propulsor rotor.

The first propulsor rotor may be rotatable about a first axis. The second propulsor rotor may be rotatable about a second axis that is angularly offset from the first axis.

The first propulsor rotor may be configured as or otherwise include a ducted rotor.

The second propulsor rotor may be configured as or otherwise include an open rotor.

The second propulsor rotor may be one of a plurality of second propulsor rotors rotatably driven by the rotating structure during the second mode.

The gas turbine engine core may also include a second rotating structure. The second rotating structure may include a compressor rotor within the compressor section and a second turbine rotor within the turbine section.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
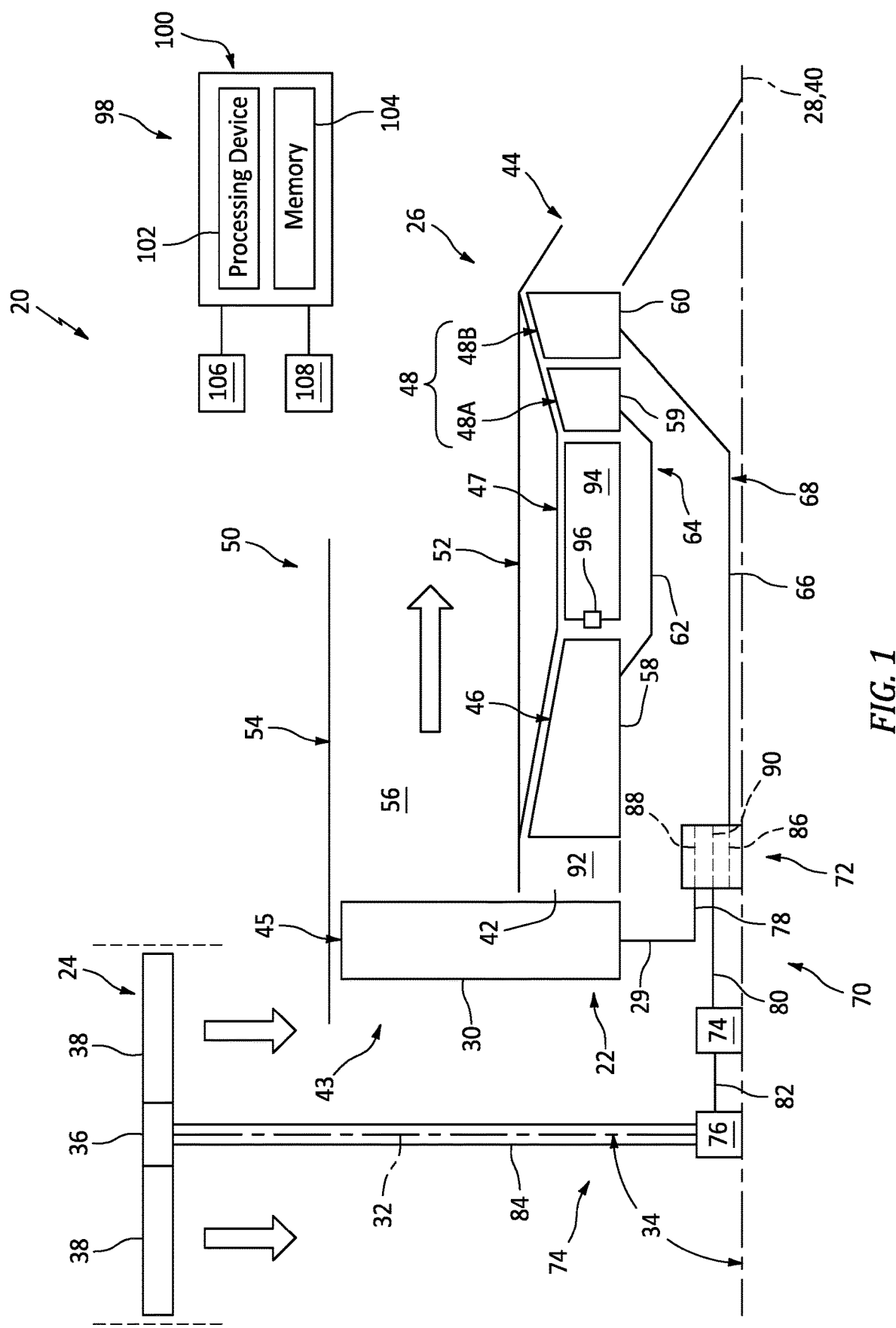
FIG. 1 is a partial, schematic illustration of an aircraft propulsion system.

FIG. 1 schematically illustrates a propulsion system 20 for an aircraft. The aircraft may be an airplane, a helicopter, a drone (e.g., an unmanned aerial vehicle (UAV)), a spacecraft or any other manned or unmanned aerial vehicle. This aircraft may be configured as a vertical take-off and landing (VTOL) aircraft or a short take-off and vertical landing (STOVL) aircraft. The aircraft propulsion system 20 of FIG. 1, for example, is configured to generate power for first direction propulsion (e.g., propulsive thrust) during a first mode of operation and to generate power for second direction propulsion (e.g., propulsive lift) during a second mode of operation, where the first direction is different than (e.g., angularly offset from) the second direction. The first mode may be a horizontal (e.g., forward) flight mode where the first direction propulsion is substantially horizontal (e.g., within 5 degrees, 10 degrees, etc. of a horizontal axis) propulsive thrust. The second mode may be a vertical flight and/or hover mode where the second direction propulsion is substantially vertical (e.g., within 5 degrees, 10 degrees, etc. of a vertical axis) propulsive lift. The aircraft propulsion system 20, of course, may also be configured to generate both the first direction propulsion (e.g., horizontal thrust) and the second direction propulsion (e.g., vertical lift) during a third (e.g., transition) mode of operation. The aircraft propulsion system 20 of FIG. 1 includes at least one bladed first propulsor rotor 22, at least one bladed second propulsor rotor 24 and a gas turbine engine core 26 configured to rotatably drive the first propulsor rotor 22 and the second propulsor rotor 24.

The first propulsor rotor 22 may be configured as a ducted rotor such as a fan rotor. The first propulsor rotor 22 of FIG. 1 is rotatable about a first rotor axis 28. This first rotor axis 28 is an axial centerline of the first propulsor rotor 22 and may be horizontal when the aircraft is on ground. The first propulsor rotor 22 includes at least a first rotor disk 29 and a plurality of first rotor blades 30 (on visible in FIG. 1); e.g., fan blades. The first rotor blades 30 are distributed circumferentially around the first rotor disk 29 in an annular array. Each of the first rotor blades 30 is connected to and projects radially (relative to the first rotor axis 28) out from the first rotor disk 29.

The second propulsor rotor 24 may be configured as an open rotor such as a propeller rotor or a helicopter (e.g., main) rotor. Of course, in other embodiments, the second propulsor rotor 24 may alternatively be configured as a ducted rotor such as a fan rotor; e.g., see dashed line duct. The second propulsor rotor 24 of FIG. 1 is rotatable about a second rotor axis 32. This second rotor axis 32 is an axial centerline of the second propulsor rotor 24 and may be vertical when the aircraft is on the ground. The second rotor axis 32 is angularly offset from the first rotor axis 28 by an included angle 34; e.g., an acute angle or a right angle. This included angle 34 may be between sixty degrees (60°) and ninety degrees (90°); however, the present disclosure is not limited to such an exemplary relationship. The second propulsor rotor 24 includes at least a second rotor disk 36 and a plurality of second rotor blades 38; e.g., open rotor blades. The second rotor blades 38 are distributed circumferentially around the second rotor disk 36 in an annular array. Each of the second rotor blades 38 is connected to and projects radially (relative to the second rotor axis 32) out from the second rotor disk 36.

The engine core 26 extends axially along a core axis 40 between a forward, upstream airflow inlet 42 and an aft, downstream core exhaust nozzle 44; e.g., a fixed exhaust nozzle. The core axis 40 may be an axial centerline of the engine core 26 and may be horizontal when the aircraft is on the ground. This core axis 40 may be parallel (e.g., coaxial) with the first rotor axis 28 and, thus, angularly offset from the second rotor axis 32. The engine core 26 of FIG. 1 includes a compressor section 46, a combustor section 47 and a turbine section 48. The turbine section 48 of FIG. 1 includes a high pressure turbine (HPT) section 48A and a low pressure turbine (LPT) section 48B (also sometimes referred to as a power turbine section).

The engine sections 46-48B are arranged sequentially along the core axis 40 within an engine housing 50. This engine housing 50 includes an inner case 52 (e.g., a core case) and an outer case 54 (e.g., a fan case). The inner case 52 may house one or more of the engine sections 46-48B; e.g., the engine core 26. The outer case 54 may house the first propulsor rotor 22. The outer case 54 of FIG. 1 also axially overlaps and extends circumferentially about (e.g., completely around) the inner case 52 thereby at least partially forming a bypass flowpath 56 radially between the inner case 52 and the outer case 54.

Each of the engine sections 46, 48A and 48B includes a bladed rotor 58-60 within that respective engine section 46, 48A, 48B. Each of these bladed rotors 58-60 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The compressor rotor 58 is connected to the HPT rotor 59 through a high speed shaft 62. At least (or only) these engine components 58, 59 and 62 collectively form a high speed rotating structure 64. This high speed rotating structure 64 is rotatable about the core axis 40. The LPT rotor 60 is connected to a low speed shaft 66. At least (or only) these engine components 60 and 66 collectively form a low speed rotating structure 68. This low speed rotating structure 68 is rotatable about the core axis 40. The low speed rotating structure 68 and, more particularly, its low speed shaft 66 may project axially through a bore of the high speed rotating structure 64 and its high speed shaft 62.

The aircraft propulsion system 20 of FIG. 1 includes a powertrain 70 that couples the low speed rotating structure 68 to the first propulsor rotor 22 and that couples the low speed rotating structure 68 to the second propulsor rotor 24. The powertrain 70 of FIG. 1 includes a geartrain 72, a transmission 74 and a gearing 76; e.g., bevel gearing. The powertrain 70 of FIG. 1 also includes one or more shafts 78, 80, 82 and 84 and/or other torque transmission devices for coupling the geartrain 72 to the first propulsor rotor 22 and the second propulsor rotor 24.

The geartrain 72 may be configured as an epicyclic geartrain such as, but not limited to, a planetary geartrain and/or a star geartrain. The geartrain 72 of FIG. 1, for example, includes a first component 86 (e.g., an inner gear such as a sun gear), a second component 88 (e.g., an outer gear such as a ring gear) and a third component 90 (e.g., a carrier supporting one or more intermediate gears such as planet or star gears), where the components 86, 88 and 90 (or the gears attached thereto) are meshed or otherwise engaged with one another. The first component 86 is connected to the low speed rotating structure 68 and its low speed shaft 66. The second component 88 is connected to the first propulsor rotor 22 through the first propulsor shaft 78, where the first propulsor shaft 78 may form an output from the geartrain 72 and the engine core 26. The third component 90 is connected to an input of the transmission 74 through the geartrain output shaft 80, where the geartrain output shaft 80 may form another output from the geartrain 72 and the engine core 26.

An output of the transmission 74 is connected to an input of the gearing 76 through the transmission output shaft 82. This transmission 74 may be configured to selectively couple (e.g., transfer mechanical power between) the geartrain output shaft 80 (or the low speed shaft 66; e.g., see FIG. 4) and the transmission output shaft 82. During the first mode of operation, for example, the transmission 74 may be configured to decouple the geartrain output shaft 80 (or the low speed shaft 66; e.g., see FIG. 4) from the transmission output shaft 82, thereby decoupling the low speed rotating structure 68 form the second propulsor rotor 24. During the second mode of operation (and the third mode of operation), the transmission 74 may be configured to couple the geartrain output shaft 80 (or the low speed shaft 66; e.g., see FIG. 4) with the transmission output shaft 82, thereby coupling the low speed rotating structure 68 with the second propulsor rotor 24. The transmission 74 may be configured as a clutched transmission or a clutchless transmission.

An output of the gearing 76 is connected to the second propulsor rotor 24 through the second propulsor shaft 84. This gearing 76 provides a coupling between the transmission output shaft 82 rotating about the axis 28, 40 and the second propulsor shaft 84 rotating about the second rotor axis 32. The gearing 76 may also provide a speed change mechanism between the transmission output shaft 82 and the second propulsor shaft 84. The gearing 76, however, may alternatively provide a 1:1 rotational coupling between the transmission output shaft 82 and the second propulsor shaft 84 such that these shafts 82 and 84 rotate at a common (e.g., the same) speed. Furthermore, in some embodiments, the gearing 76 and the transmission output shaft 82 may be omitted where the functionality of the gearing 76 is integrated into the transmission 74. In still other embodiments, the transmission 74 may be omitted where decoupling of the second propulsor rotor 24 is not required.

During operation of the aircraft propulsion system 20, air enters the engine core 26 through the airflow inlet 42. This air is directed into a core flowpath 92 which extends sequentially through the compressor section 46, the combustor section 47, the HPT section 48A and the LPT section 48B to the core exhaust nozzle 44. The air within this core flowpath 92 may be referred to as core air.

The core air is compressed by the compressor rotor 58 (or the compressor rotors 58' and 58 of FIG. 4) and directed into a (e.g., annular) combustion chamber 94 of a (e.g., annular) combustor in the combustor section 47. Fuel is injected into the combustion chamber 94 through one or more fuel injectors 96 (one visible in FIG. 1) and mixed with the compressed core air to provide a fuel-air mixture. This fuel-air mixture is ignited and combustion products thereof flow through and sequentially cause the HPT rotor 59 and the LPT rotor 60 to rotate. The rotation of the HPT rotor 59 drives rotation of the high speed rotating structure 64 and its compressor rotor 58. The rotation of the LPT rotor 60 drives rotation of the low speed rotating structure 68. The rotation of the low speed rotating structure 68 drives rotation of the first propulsor rotor 22 through the geartrain 72 during a select mode or modes of operation; e.g., the first and the third modes of operation. The rotation of the low speed rotating structure 68 drives rotation of the second propulsor rotor 24 through the geartrain 72 during a select mode or modes of operation; e.g., the second and the third modes of operation. During the first mode of operation, the transmission 74 may decouple the low speed rotating structure 68 from the second propulsor rotor 24 such that the low speed rotating structure 68 does not drive rotation of the second propulsor rotor 24. The second propulsor rotor 24 may thereby be stationary (or windmill) during the first mode of operation.

During at least the first mode of operation, the rotation of the first propulsor rotor 22 propels bypass air (separate from the core air) through the aircraft propulsion system 20 and its bypass flowpath 56 to provide the first direction propulsion; e.g., the forward, horizontal thrust. During at least the second mode of operation, the rotation of the second propulsor rotor 24 propels additional air (separate from the core air and the bypass air) to provide the second direction propulsion; e.g., vertical lift. The aircraft may thereby take-off, land and/or otherwise hover during the second mode of operation, and the aircraft may fly forward or otherwise move during the first mode of operation.

Figure 4:
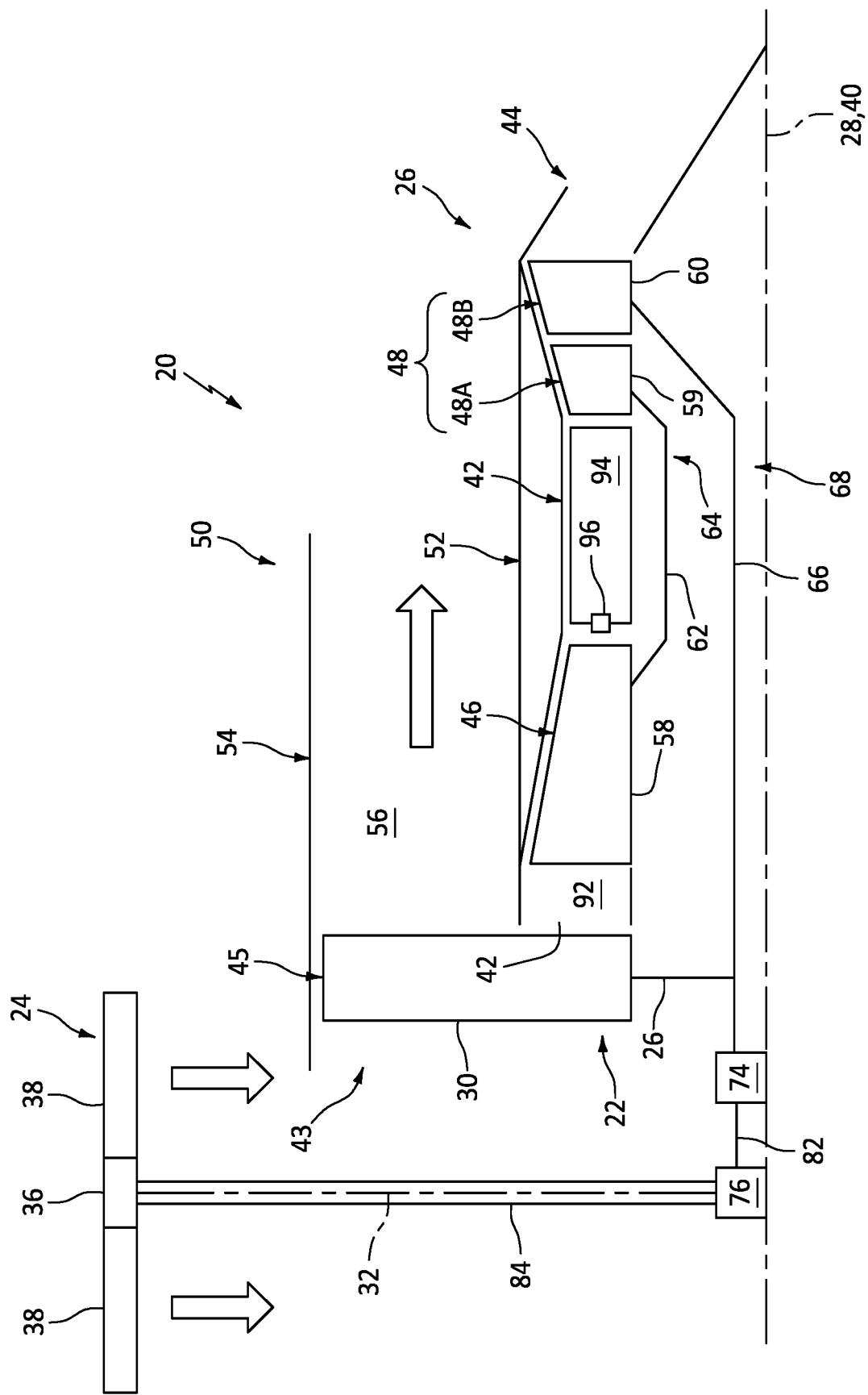
FIG. 4 is a partial schematic illustration of the aircraft propulsion system configured without a geartrain.

During each mode of operation, the low speed rotating structure 68 is coupled to the first propulsor rotor 22 through the geartrain 72 (or the low speed shaft 66; e.g., see FIG. 4). Rotation of the first propulsor rotor 22 at or above a certain rotational speed may generate horizontal thrust during the first mode of operation to propel the aircraft horizontally forward. Generating horizontal thrust (or significant amounts of horizontal thrust) may hinder and/or be less advantageous for certain aircraft takeoff, landing and/or hovering maneuvers during the second mode of operation. Furthermore, producing horizontal thrust with the first propulsor rotor 22 during the second mode of operation may also take away engine core power that could otherwise be provided to the second propulsor rotor 24 for vertical aircraft lift. The aircraft propulsion system 20 of FIG. 1 is therefore provided with a thrust control system 98. This thrust control system 98 is configured to reduce (or ideally eliminate) the horizontal thrust generated by the first propulsor rotor 22 during the second mode of operation.

The thrust control system 98 of FIG. 1 includes the engine core 26 and an engine controller 100. The engine controller 100 may be implemented with a combination of hardware and software. The hardware may include at least one processing device 102 and memory 104. The processing device 102 may include one or more single-core and/or multi-core processors. The hardware may also or alternatively include analog and/or digital circuitry other than that described above.

The memory 104 is configured to store software (e.g., program instructions) for execution by the processing device 102, which software execution may control and/or facilitate performance of one or more operations such as those described below. The memory 104 may be a non-transitory computer readable medium. For example, the memory 104 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The engine controller 100 is configured to selectively control operation of the engine core 26. The engine controller 100, for example, may signal a fuel flow device 106 (e.g., a fuel pump, a fuel valve, etc.) to regulate (e.g., maintain, increase or decrease) fuel delivery to the injectors 96. The engine controller 100 may signal an actuator 108 coupled to a variable vane array within one of the engine sections 46, 48 to regulate (e.g., maintain, increase or decrease) gas flow through the variable vane array. The engine controller 100, of course, may also or alternatively signal one or more other devices within the aircraft propulsion system to influence operation of the engine core 26.

During the first mode of operation, the engine core 26 is operated by the engine controller 100 to rotate the low speed rotating structure 68 at a relatively fast first rotational speed (X) about the axis 28, 40. During the second mode of operation, the engine core 26 is operated by the engine controller 100 to rotate the low speed rotating structure 68 at a relatively slow second rotational speed (Y) about the axis 28, 40. The second rotational speed is selected to be less than the first rotational speed. The second rotational speed, for example, may be equal to or less than eighty percent (80%) of the first rotational speed. More particularly, the second rotational speed may be between fifty-five percent (55%) and seventy-five percent (75%) of the first rotational speed.

Figure 2:
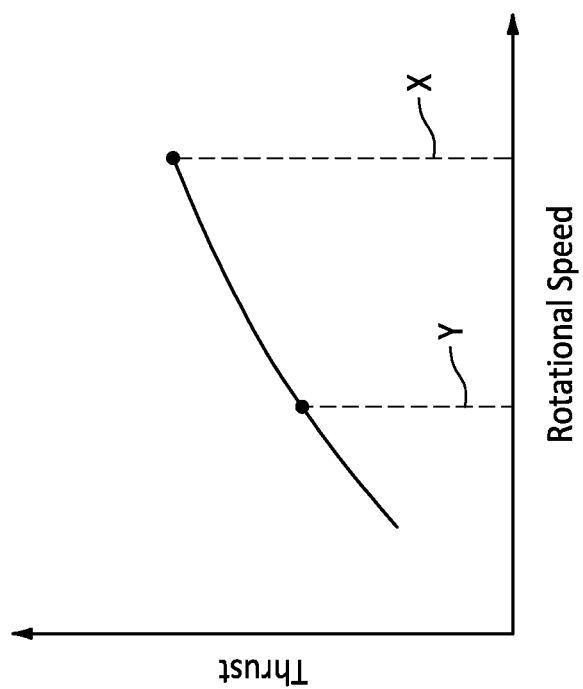
FIG. 2 is a graph depicting a relationship between rotational speed and thrust.

Referring to FIGS. 1 and 2, rotational speed of the first propulsor rotor 22 may be directly related to the propulsive thrust generated by the first propulsor rotor 22. Therefore, since the low speed rotating structure 68 drives rotation of the first propulsor rotor 22, decreasing the rotational speed of the low speed rotating structure 68 may reduce the propulsive thrust generated by the first propulsor rotor 22. The first propulsor rotor 22 may thereby generate less propulsive thrust during the second mode of operation where the low speed rotating structure 68 is rotating at the relatively slow second rotational speed than during the first mode of operation where the low speed rotating structure 68 is rotating at the relatively fast first rotational speed.

The blades 30 of the first propulsor rotor 22 of FIG. 1 may have blade profiles designed to provide relatively high (e.g., maximum) efficiency and/or generate relatively high (e.g., maximum) propulsive thrust while the low speed rotating structure 68 is rotating at the first rotational speed. These blade profiles may also be designed to generate relatively low or de minimis thrust while the low speed rotating structure 68 is rotating at the second rotational speed. The propulsive thrust generated by the first propulsor rotor 22 during the first mode (or the third mode) of operation, for example, may be at least one and one-half times (1.5×), two times (2×), five times (5×) or more thrust/propulsive power generated by the first propulsor rotor 22 (if any at all) during the second mode of operation. Since the thrust generated by (e.g., work performed by) the first propulsor rotor 22 is significantly reduced (or ideally eliminated) during the second mode of operation, more rotational power may be transmitted from the low speed rotating structure 68 to the second propulsor rotor 24 during the second mode of operation.

While the first propulsor rotor 22 may be optimized for rotation of the low speed rotating structure 68 at the first rotational speed, the second propulsor rotor 24 may be optimized for rotation of the low speed rotating structure 68 at the second rotational speed. More particularly, the blades 38 of the second propulsor rotor 24 may have blade profiles designed to provide relatively high (e.g., maximum) efficiency and/or generate relatively high (e.g., maximum) propulsive lift while the low speed rotating structure 68 is rotating at the second rotational speed. Therefore, even though the first propulsor rotor 22 is generating less thrust during the second mode of operation, the second propulsor rotor 24 may be operating to its full potential.

Figure 3:
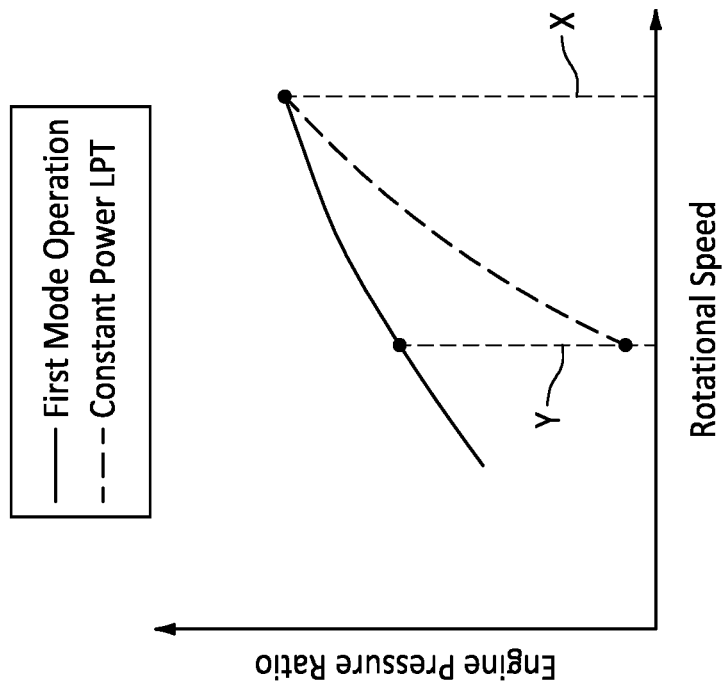
FIG. 3 is a graph depicting a relationship between rotational speed and engine pressure ratio (EPR).
Figure 5:
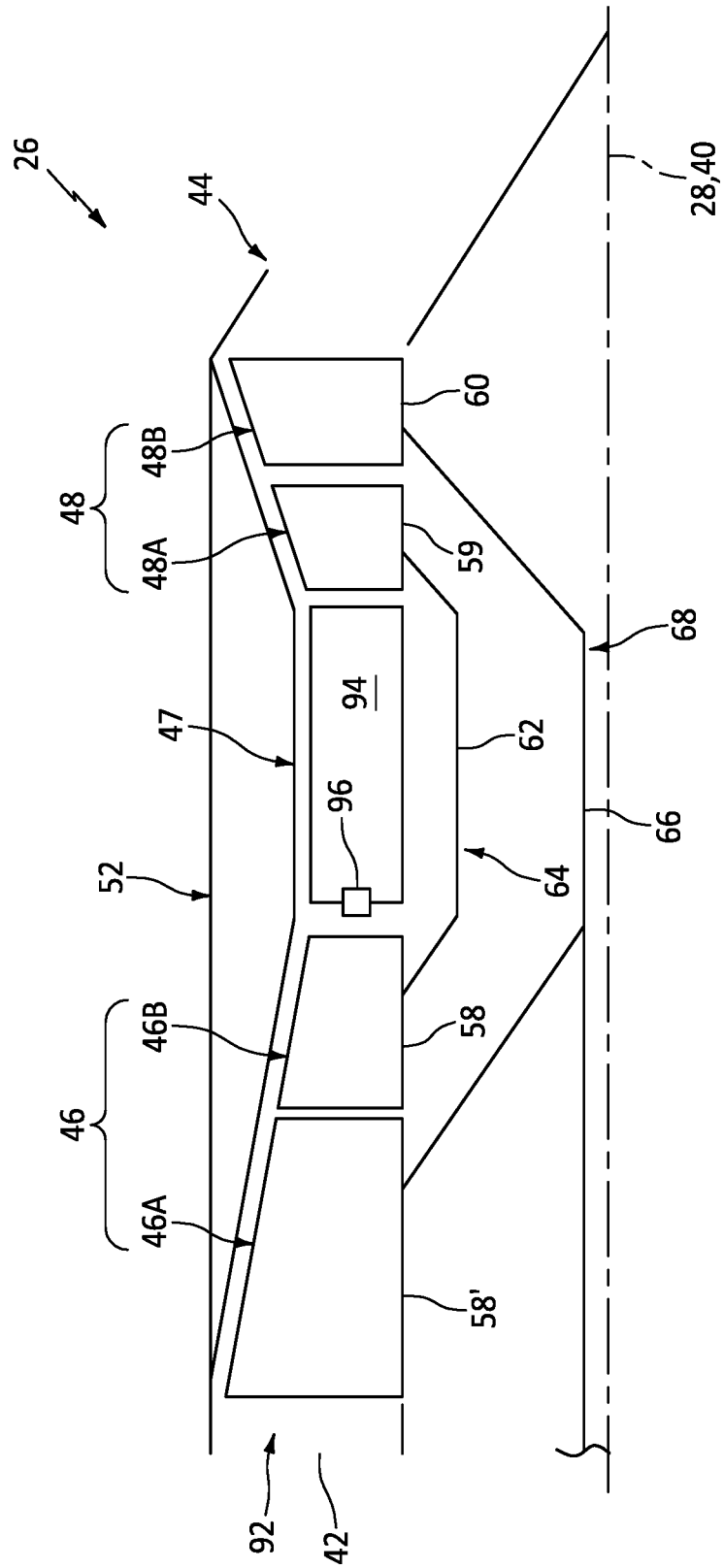
FIG. 5 is a partial schematic illustration of a gas turbine engine core with multi-staged compressor rotors.

Reducing the rotational speed of the low speed rotating structure 68 reduces compression performed by the first propulsor rotor 22 (and the compressor rotor 58' of FIG. 5) and, thus, a pressure ratio across a section 45, which includes the first propulsor rotor 22, and compressor section 46. However, the LPT section 48B may have a substantially uniform pressure ratio across a range of rotational speeds using, for example, the incident-tolerant aerodynamics. Therefore, referring to FIG. 3, reducing the rotational speed of the low speed rotating structure 68 may also reduce an engine pressure ratio (EPR) of the aircraft propulsion system 20 and, thus, (e.g., horizontal) propulsive thrust generated by the engine core 26. This engine pressure ratio may be measured as a total gas pressure at the exhaust nozzle 44 divided by a total gas pressure at an airflow inlet 43 to the propulsor section 45. For example, while the low speed rotating structure 68 is rotating at the first rotational speed during the first mode of operation, the aircraft propulsion system 20 may have a first engine pressure ratio greater than 1.2; e.g., between 1.25 and 3.0. However, while the low speed rotating structure 68 is rotating at the second rotational speed during the second mode of operation, the aircraft propulsion system 20 may have a second engine pressure ratio less than 1.1; e.g., between 1.01 and 1.06. Decreasing the rotational speed of the low speed rotating structure 68 may thereby reduce both horizontal thrust generated by the first propulsor rotor 22 and the engine core 26.

In some embodiments, the low speed rotating structure 68 is coupled to the first propulsor rotor 22 and/or the second propulsor rotor 24 through the geartrain 72. In other embodiments, referring to FIG. 4, the low speed rotating structure 68 may be coupled to the first propulsor rotor 22 and/or the second propulsor rotor 24 without a geartrain. The first propulsor rotor 22 of FIG. 4, for example, is coupled to the low speed shaft 66 through a direct connection such that the first propulsor rotor 22 rotates at a common (e.g., the same) speed with the low speed rotating structure 68.

In some embodiments, referring to FIGS. 1 and 4, the low speed rotating structure 68 may be configured without a compressor rotor. In other embodiments, referring to FIG. 5, the low speed rotating structure 68 may include a low pressure compressor (LPC) rotor 58' arranged within a low pressure compressor (LPC) section 46A of the compressor section 46. In such embodiments, the compressor rotor 58 may be a high pressure compressor (HPC) rotor within a high pressure compressor (HPC) section 46B of the compressor section 46.

Figure 6:
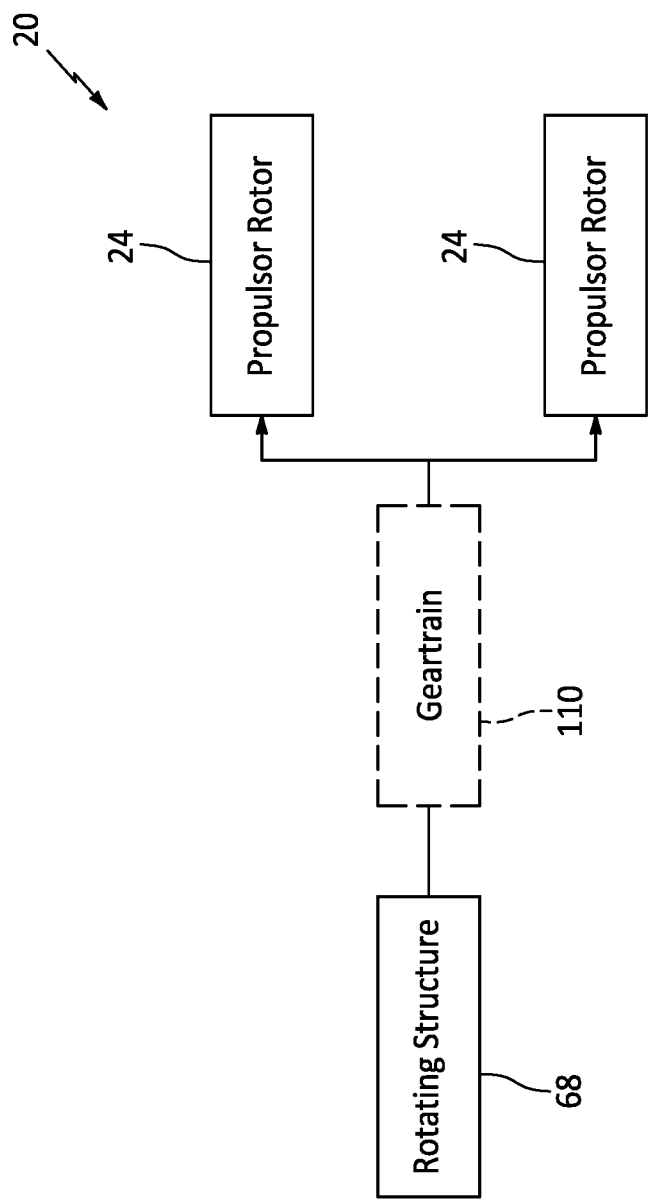
FIG. 6 is a partial schematic illustration of a rotating structure coupled to and driving multiple propulsor rotors for generating propulsive lift.

The engine core 26 may have various configurations other than those described above. The engine core 26, for example, may be configured with a single spool, with two spools (e.g., see FIG. 1), or with more than two spools. The engine core 26 may be configured with one or more axial flow compressor sections, one or more radial flow compressor sections, one or more axial flow turbine sections and/or one or more radial flow turbine sections. The engine core 26 may be configured with any type or configuration of annular, tubular (e.g., CAN), axial flow and/or reverser flow combustor. The present disclosure therefore is not limited to any particular types or configurations of gas turbine engine cores. Furthermore, it is contemplated the engine core 26 of the present disclosure may drive more than the two propulsors 22 and 24. The aircraft propulsion system 20, for example, may include two or more of the first propulsor rotors 22 and/or two or more of the second propulsor rotors 24. For example, the aircraft propulsion system 20 of FIG. 6 includes multiple second propulsor rotors 24 rotatably driven by the low speed rotating structure 68. These second propulsor rotors 24 may rotate about a common axis. Alternatively, each second propulsor rotor 24 may rotate about a discrete axis where, for example, the second propulsor rotors 24 are laterally spaced from one another and coupled to the low speed rotating structure 68 through a power splitting geartrain 110.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A propulsion system for an aircraft, comprising:
a powertrain;
a first propulsor rotor configured to generate propulsive thrust;
a second propulsor rotor configured to generate propulsive lift; and
a thrust control system comprising an engine controller and a gas turbine engine core, the gas turbine engine core comprising a compressor section, a combustor section, a turbine section and a rotating structure, the rotating structure comprising a turbine rotor within the turbine section, the engine controller including a processing device and a memory, and the engine controller configured to selectively control operation of the gas turbine engine core, such that the gas turbine engine core operates in a first mode of operation and a second mode of operation, and the engine controller selectively controls operation of the gas turbine engine core such that an engine pressure ratio of the propulsion system decreases from a first engine pressure ratio during the first mode of operation to a second engine pressure ratio during the second mode of operation, the second engine pressure ratio lower than the first engine pressure ratio, to reduce the propulsive thrust generated by the first propulsor rotor;
the powertrain configured to couple the rotating structure to the first propulsor rotor and to decouple the rotating structure from the second propulsor rotor during the first mode of operation;
the gas turbine engine core configured to rotate the rotating structure at a first rotational speed during the first mode of operation to drive the first propulsor rotor to generate the propulsive thrust; and
the gas turbine engine core configured to rotate the rotating structure at a second rotational speed during the second mode of operation to drive the second propulsor rotor to generate the propulsive lift, wherein the second rotational speed is less than eighty percent of the first rotational speed,
wherein
the first propulsor rotor comprises a plurality of first blades, each of the plurality of first blades having a blade profile configured to generate higher propulsive thrust at the first rotational speed than at the second rotational speed; and
the second propulsor rotor comprises a plurality of second blades, each of the plurality of second blades having a blade profile configured to generate high a maximum propulsive lift at the second rotational speed.

2. The propulsion system of claim 1, wherein the second rotational speed is between fifty-five percent and seventy-five percent of the first rotational speed.

3. The propulsion system of claim 1, wherein the first engine pressure ratio is greater than 1.2.

4. The propulsion system of claim 1, wherein the second engine pressure ratio is less than 1.1.

5. The propulsion system of claim 1, wherein
the first engine pressure ratio is between 1.25 and 3.0; and
the second engine pressure ratio is between 1.01 and 1.06.

6. The propulsion system of claim 1, wherein
the gas turbine engine core is further configured to rotate the first propulsor rotor during the second mode; and
the first propulsor rotor is configured to generate at least one and one-half times more thrust during the first mode than during the second mode.

7. The propulsion system of claim 1, wherein the powertrain comprises a transmission configured to couple the second propulsor rotor to the rotating structure during second mode.

8. The propulsion system of claim 1, wherein the powertrain comprises a geartrain coupling the rotating structure to the first propulsor rotor and the second propulsor rotor.

9. The propulsion system of claim 1, wherein
the first propulsor rotor is rotatable about a first axis; and
the second propulsor rotor is rotatable about a second axis that is angularly offset from the first axis.

10. The propulsion system of claim 1, wherein the first propulsor rotor comprises a ducted rotor.

11. The propulsion system of claim 1, wherein the second propulsor rotor comprises an open rotor.

12. The propulsion system of claim 1, wherein the second propulsor rotor is one of a plurality of second propulsor rotors rotatably driven by the rotating structure during the second mode.

13. The propulsion system of claim 1, wherein
the gas turbine engine core further includes a second rotating structure;
the second rotating structure includes a compressor rotor within the compressor section and a second turbine rotor within the turbine section.

14. A propulsion system for an aircraft, comprising:
a first propulsor rotor configured to generate propulsive thrust;
a second propulsor rotor configured to generate propulsive lift; and
a thrust control system comprising an engine controller and a gas turbine engine core, the gas turbine engine core comprising a compressor section, a combustor section, a turbine section and a rotating structure, the rotating structure comprising a turbine rotor within the turbine section, the engine controller including a processing device and a memory, and the engine controller configured to selectively control operation of the gas turbine engine core, such that the gas turbine engine core operates in a first mode of operation and a second mode of operation, and such that an engine pressure ratio of the propulsion system decreases from a first engine pressure ratio during the first mode of operation to a second engine pressure ratio during the second mode of operation, the second engine pressure ratio lower than the first engine pressure ratio, to reduce the propulsive thrust generated by the first propulsor rotor;
the gas turbine engine core configured to rotate the rotating structure during the first mode of operation to drive the first propulsor rotor to generate the propulsive thrust, and
the gas turbine engine core configured to rotate the rotating structure during the second mode of operation to drive the second propulsor rotor to generate the propulsive lift, and
the gas turbine engine core configured to rotate the rotating structure such that the propulsive thrust generated by the first propulsor rotor during the first mode of operation is 1.5 to 5 times greater than the propulsive thrust generated by the first propulsor rotor during the second mode of operation.

15. The propulsion system of claim 14, wherein the first engine pressure ratio is between 1.25 and 3.0.

16. The propulsion system of claim 14, wherein the second engine pressure ratio is between 1.01 and 1.06.

17. The propulsion system of claim 14, wherein
the gas turbine engine core is configured to rotate the rotating structure at a first rotational speed during the first mode to drive the first propulsor rotor to generate the propulsive thrust; and
the gas turbine engine core is configured to rotate the rotating structure at a second rotational speed during the second mode to drive the second propulsor rotor to generate the propulsive lift, and the second rotational speed is less than eighty percent of the first rotational speed.

18. The propulsion system of claim 17, wherein the second rotational speed is between fifty-five percent and seventy-five percent of the first rotational speed.

19. An aircraft system, comprising:
a first output configured to generate propulsive thrust;
a second output configured to generate propulsive lift; and
a thrust control system comprising an engine controller and a gas turbine engine core, the gas turbine engine core comprising a compressor section, a combustor section, a turbine section and a rotating structure, the rotating structure comprising a turbine rotor within the turbine section, the engine controller including a processing device and a memory, and the engine controller configured to selectively control operation of the gas turbine engine core, such that the gas turbine engine core comprises a first mode of operation and a second mode of operation;
the gas turbine engine core configured to rotate the rotating structure at a first rotational speed during the first mode of operation to rotatably drive the first output, and the aircraft system having a first engine pressure ratio between 1.25 and 3.0 during the first mode; and
the gas turbine engine core configured to rotate the rotating structure at a second rotational speed during the second mode of operation to rotatably drive the second output, the second rotational speed between fifty-five percent and seventy-five percent of the first rotational speed, and the aircraft system having a second engine pressure ratio between 1.01 and 1.06 during the second mode;
wherein the engine controller selectively controls operation of the gas turbine engine core such that an engine pressure ratio of the aircraft system decreases from the first engine pressure ratio during the first mode of operation to the second engine pressure ratio during the second mode of operation to reduce the propulsive thrust generated by the first output.

* * * * *